United States Patent [19]

Takasu et al.

[11] Patent Number: 4,734,714
[45] Date of Patent: Mar. 29, 1988

[54] OPTICAL PRINT HEAD WITH LED DIODE ARRAY

[75] Inventors: Hiromi Takasu; Shigeru Sakaguchi, both of Tottori, Japan

[73] Assignees: Sanyo Electric Co., Ltd.; Tottori Sanyo Electric Co., Ltd., both of Japan

[21] Appl. No.: 743,669

[22] PCT Filed: Sep. 27, 1984

[86] PCT No.: PCT/JP84/00462
§ 371 Date: Jun. 11, 1985
§ 102(e) Date: Jun. 11, 1985

[87] PCT Pub. No.: WO86/02045
PCT Pub. Date: Apr. 10, 1986

[51] Int. Cl.$^4$ .............................................. G01D 9/42
[52] U.S. Cl. ..................................... 346/107 R; 354/4
[58] Field of Search ............... 346/107 R, 108; 354/4, 354/12

[56] References Cited

U.S. PATENT DOCUMENTS

| 4,524,372 | 6/1985 | De Cock | 346/107 R |
| 4,525,729 | 6/1985 | Agulnek | 346/107 R |
| 4,536,778 | 8/1985 | De Schamphelaere | 346/107 R |
| 4,571,602 | 2/1986 | De Schamphelaere | 346/108 |

Primary Examiner—E. A. Goldberg
Assistant Examiner—Mark Reinhart
Attorney, Agent, or Firm—Darby & Darby

[57] ABSTRACT

An optical printer includes an optical printing head and a photosensitive member. Although quiet and fine printing can be performed when a light emitting diode array is employed as the optical printing head, there have been problems, on the other hand, such as difficulty in driving and difficulty in adjustment of primary factors directly affecting the printing quality such as uneveness in dot pitches and intensity. Therefore, the present invention copes with driving conditions by effectively distributing data transferring during static driving, thereby to improve the printing quality by selective printing timings.

8 Claims, 10 Drawing Figures

1: SCHOTTKY TTL
2: STANDARD TTL
3: LS-TTL (HIGH SPEED TTL)
4: CMOS ($V_{DD}=15V$)
5: CMOS ($V_{DD}=10V$)
6: CMOS ($V_{DD}=5V$)

OPTICAL PRINT HEAD WITH LED DIODE ARRAY

FIELD OF THE INVENTION

The present invention relates to an optical printing head to be employed in an optical printer which reflects aligned dot-shaped optical images on a photosensitive member for printing the same. More specifically, it relates to an optical printing head which comprises light emitting diode arrays and means for driving the same as the optical printing head.

BACKGROUND OF THE INVENTION

Recently, in a computer terminal device, a plain paper copying apparatus, a picture record printer and the like, optical printers utilizing a combination of fine light emitting points and photosensitive members have been developed with attention directed to advantages thereof such as high-speed, high resolution, fineness in printing and quietness of the devices. Such devices are called as a laser printer, a light emitting diode printer (LED printer) and the like depending on types of light sources employed therein.

LED printers according to the prior art of interest are disclosed in U.S. Pat. Nos. 3,850,517 (Stephany et al.), 4,318,597 (Kotani et al.) and Japanese patent laying-open gazette No. 55770/1984 (Yoshida) etc. These are now briefly described with attention to optical printing heads and driving methods.

First, the LED printer disclosed in U.S. Pat. No. 3,850,517 has a decoder in each block of light emitting diode arrays and employs codes as printing data. Therefore, although the transfer speed of the printing data itself is high, a number of decoders and printing timings after decoding of the printing data are required, and further, this printer cannot be applied to printing of those not included in characters, e.g., picture images.

Next, the LED printer disclosed in U.S. Pat. No. 4,318,597 comprises light emitting diode arrays alternately arranged in the so-called zig-zag manner and printing data are formed by serially transferred dot information, and hence it is suitable for printing of picture images and the like. However, the data are basically transmitted to shift registers in a series manner, and one of the arrays is delayed by a memory in compliance with the zig-zag arrangement. Consequently, this LED printer requires a long data transfer time, and further requires two systems of printing timings synchronized with the cross scanning direction.

Lastly, the LED printer disclosed in Japanese patent laying-open gazette No. 55770/1984 is of a typical dynamic lighting type, and hence common electrodes are separated for each of light emitting diode arrays and a number of timing signals for light emitting points are required with respect to a horizontal scanning line.

A light emitting diode array is provided with light emitting areas (dots) being in alignment, which correspond in size and position to dots to be printed in the 1:1 ratio. On the other hand, one light emitting diode cannot form all dots over the entire length of the main scanning direction, and hence a plurality of short light emitting diode arrays are employed in alignment. Therefore, dot pitches are required to be constant in joints of the light emitting diode arrays. However, when the respective ones of the light emitting diode arrays are placed on separate substrates to be arranged in two lines as in the aforementioned materials, alignment of the optical images (i.e., supporting of the light emitting diode arrays and adjustment of the optical systems) is extremely difficult. Further, connection of common line independently provided for each of the light emitting diodes for dynamic driving complicates operation for the alignment is complicated. Placing a plurality of light emitting diode arrays on one substrate without regard to the connection of common line would be a method of solving the problem of difficulty in such work. More preferably, the plurality of light emitting diode arrays are arranged in one line.

Further, an LED printer has such an advantage that a head thereof is a solid element which enables high-speed printing, wherefore high-speed data processing is required. However, if extreme high-speed is required for the data transfer speed and the transfer time is lengthened, the said advantage cannot be efficiently applied while integrated circuit elements to be used are restricted, and the power consumption is increased in case of, e.g., a high speed TTL, leading to inconvenience.

In addition, intensity of the head shows dispersion depending on the synergistic effect of the light emitting characteristics of the light emitting diode arrays and the output characteristics of driving elements, whereas no definite countermeasures therefor are indicated in the aforementioned prior art examples. The present invention has been proposed in consideration of these points.

DISCLOSURE OF THE INVENTION

Accordingly, a primary object of the present invention is to provide an optical printing head which can print bit-unit serial printing data received therein at a high speed. According to the present invention, lowered is the shifting speed for shifting the serial printing data to correspond to positions of light emitting areas (dots) in the head. Consequently, an integrated circuit of a MOS (Metal Oxide Semiconductor) type which is a low-power consumption element can be used thereby to lower the power consumption of the optical printing head. In order to facilitate assembling of light emitting diode arrays, one side of each diode is connected as a common electrode, thereby to enable one-line alignment of dots.

Another feature of the present invention resides in that brightness control is performed in conformity to characteristics upon combination of light emitting diodes and driving elements.

The present invention is characterized in that light emitting areas (dots) of light emitting diode arrays are separated into a plurality of groups so that adjacent ones belong to groups different from each other, and serial printing data are divided and transferred per each group. Preferably, anodes or cathodes of the light emitting diode arrays are commonly connected.

By virtue of this, the shifting speed of shift registers used for serial transferring in an optical printing head in practice is 1/(number of groups) of the serial printing data as transmitted, and common side separation which prevents placing in alignment in one straight line may not be performed.

Further, in the present invention, a printing timing in response to light emission intensity is supplied to each of specified blocks, and preferably wiring is selectively performed for each block from a plurality of printing timings. Consequently, the present invention can selectively obtain printing timings for making light emission intensity constant after arrangement and wiring of elements.

Other objects and features of the present invention will be more apparent from the detailed description hereafter made with reference to the drawings.

BEST MODES OF CARRYING OUT THE INVENTION

Density of light emitting areas (dots) of a light emitting diode array (hereinafter referred to as LED) employed in an optical printing head substantially corresponds to printing dot density, which density is about 9 dot/mm to 20 dot/mm or over, and a monolithic type LED is employed. There is a limitation in lengthening of an LED in relation to the size of a wafer and yield, and hence the size of an LED is made to be about 6 to 10 mm in length, and the same is utilized in arrangement in lines.

Figure 1:
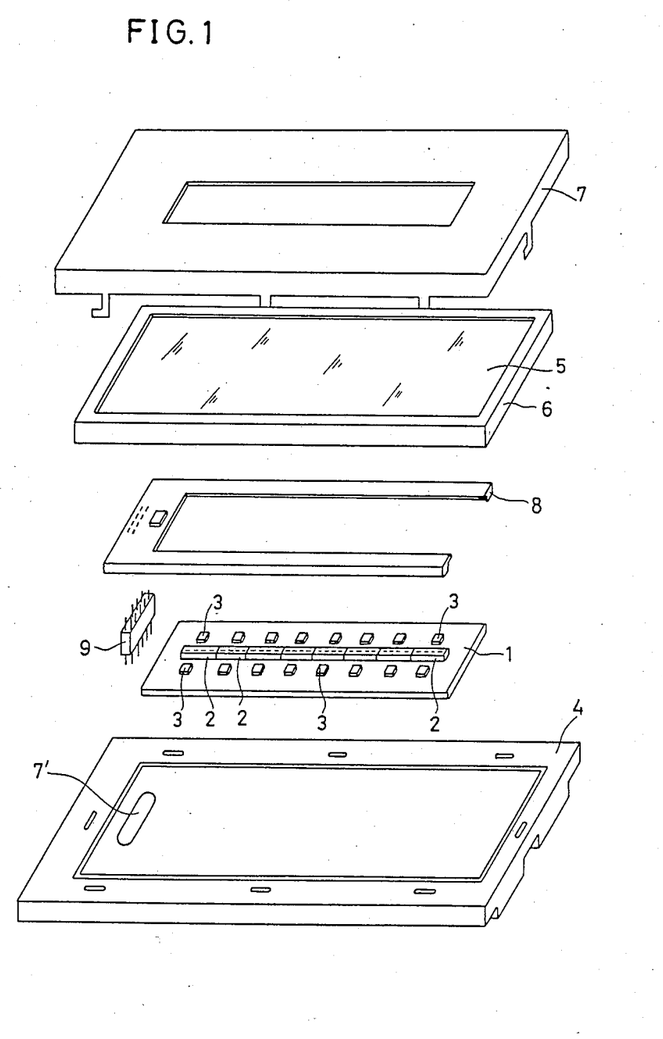
FIG. 1 is an exploded perspective view of an optical printing head according to the present invention.

FIG. 1 is an exploded perspective view of an optical printing head employing such LED, in which LEDs (2) (2) ... are arranged on a substantially central portion of a substrate (1) of ceramics etc. having patterns, and driving elements (3) (3) ... are arranged on both sides thereof. This substrate (1) is stacked on a heat sink (4) to be covered by a frame member (6) having a glass member (5). A metal frame member (7) contains these components and is fixed to the heat sink (4). A conductive path (not shown) for the substrate (1) is electrically drawn out to the exterior from a hole (7') provided in the heat sink (4) utilizing an auxiliary substrate (8) and a connector (9).

Figure 2:
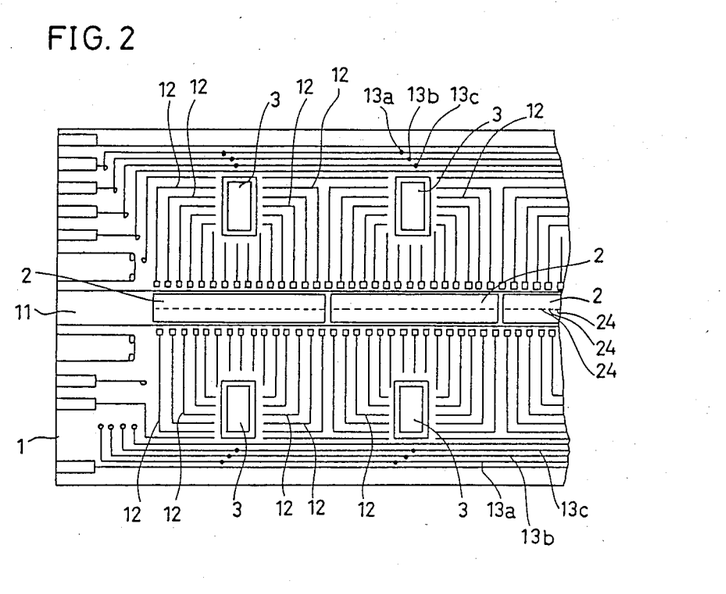
FIG. 2 is a plan view of an essential part of a substrate employed for the optical printing head (however, wire bonding thin lines for wiring are omitted).
Figure 3:
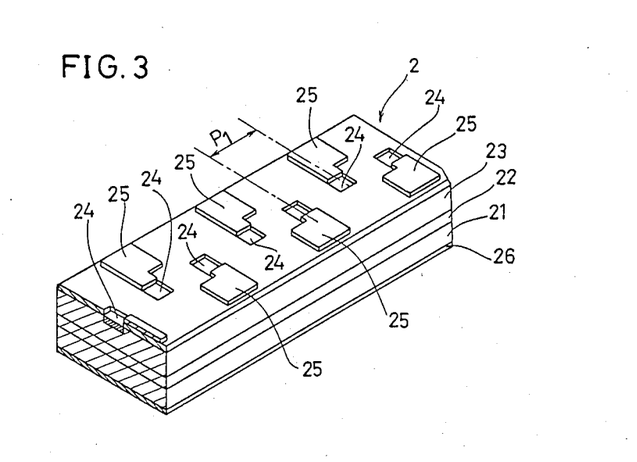
FIG. 3 is a perspective view of a light emitting diode array similarly employed for the substrate.
Figure 4:
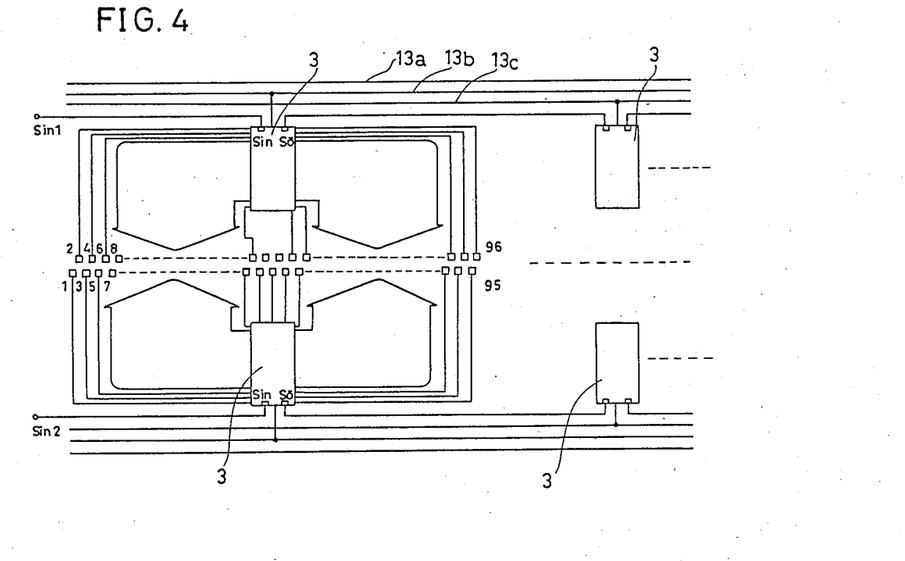
FIG. 4 is a typical wiring diagram of the substrate as shown in FIG. 3.

FIG. 2 is a plan view of an essential part of the substrate (1), in which the LEDs (2) (2) ... are arranged in alignment on a strip-shaped conductor (11) provided in the center. With respect to the LEDs (2) (2) ..., as shown in FIG. 3, a GaAsP graded layer (22) gradually changing from the substrate side from GaAs to $GaAs_{0.6}P_{0.4}$ and a $GaAs_{0.6}P_{0.4}$ layer (23) are grown in a vapor epitaxial manner on an n-type GaAs substrate (21), and light emitting areas (24) (24) ... are formed by selective diffusion by p-type impurities. Electrodes (25) and (25) for the light emitting areas (24) (24) ... are longitudinally provided in an alternate manner by aluminum etc. Further, a common electrode (26) of a gold alloy etc. is formed on the back surface of the GaAs substrate (21). The mixed crystal ratio of GaAs and GaP in the $GaAs_{0.6}P_{0.4}$ layer (23) is selected in conformity to the photosensitive characteristics of a photosensitive member (not shown) such that, e.g., an amorphous silicon photosensitive member has the maximum sensitivity of 660 nm and hence the mixed crystal ratio is made 0.6, i.e., $GaAs_{0.6}P_{0.4}$. In definite exemplification with respect to the LED (2), it has 96 dots of square-shaped light emitting areas (24) (24) ... each in size of 1 mm×8 mm and having a side of 50 μm in a pitch $P_1=84.5$ μm, thereby to have resolution of 12 dot/mm. In case of a head for an A4 size, the effective recording length (horizontal scanning length) thereof is 216 mm and hence 27 LEDs are arranged in alignment while evenly retaining the dot pitches. These LEDs (2) (2) ... are placed on and fixed to the aforementioned strip-shaped conductor (11) by a conductive bonding agent etc., whereby all of the light emitting areas (24) (24) ... are so connected that the n-sides are in common. The driving elements (3) (3) ... arranged on both sides of the LEDs (2) (2) ... contain shift registers and LED drivers, and, as hereinafter described in detail, are so wired that those positioned over the light emitting areas drive even number light emitting areas and those positioned under the same drive uneven number light emitting areas respectively in a separate manner, as shown in FIG. 4. Wiring of the same is performed by conductive patterns (12) (12) ... on the substrate (1) and wire bonding thin lines (not shown) with respect to the same. Three conductive patterns (13a), (13b) and (13c) provided in parallel to the array of the LEDs (2) (2) ... are duty lines for brightness control, which are also hereinafter described in detail.

Figure 5:
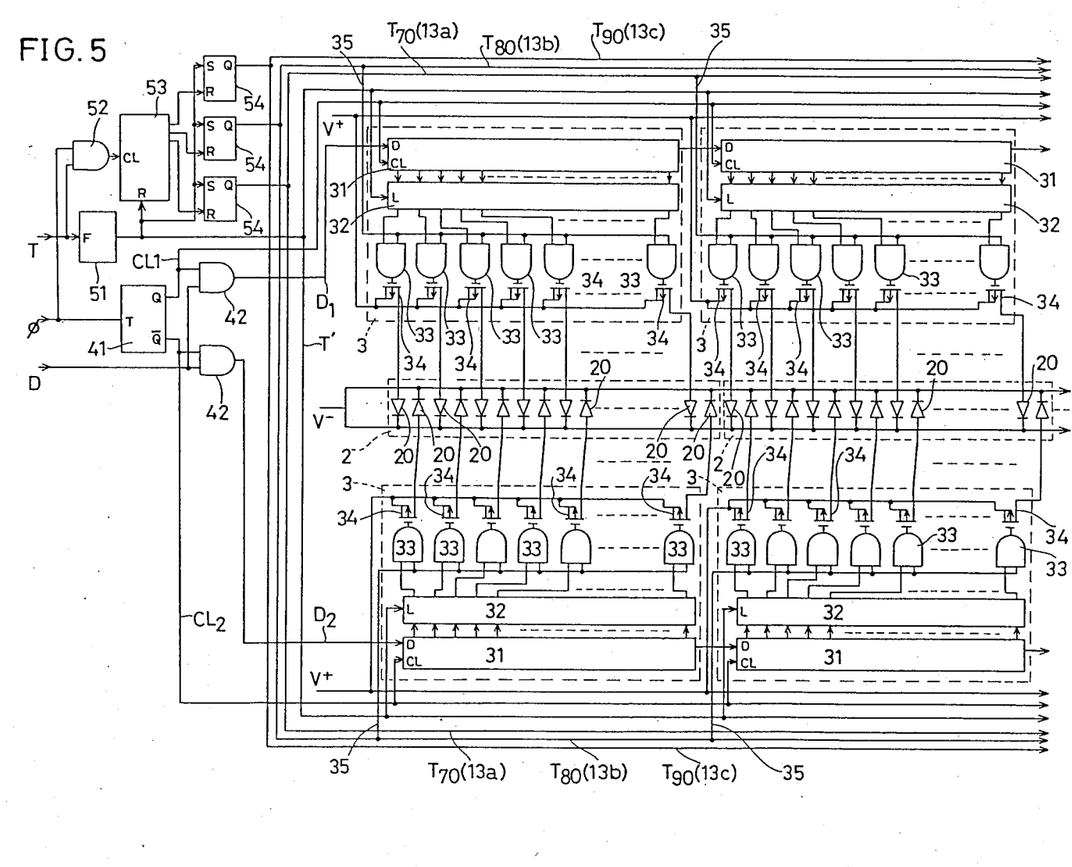
FIG. 5 is a circuit diagram of an essential part of an optical printing head according to an embodiment of the present invention.

FIG. 5 is a circuit diagram of an essential part of the optical printing head according to the embodiment of the present invention, in which diodes (20) (20) ... correspond to the light emitting areas (24) (24) ... and the LEDs (2) (2) ... have common cathodes as hereinabove described, which are connected to the minus side ($V^-$ or ground potential) of a driving power source. On the other hand, the driving elements (3) (3) ... are formed by MOS-type LSI, and have shift registers (31) (31) ... in a bit number (N/2 bits) corresponding to ½ of a number N (N=96 in the aforementioned example) of the diodes (20) (20) ... for one LED (2) and latch circuits (32) (32) ... of N/2 bits, as well as N/2 of AND gates (33) (33) ... and driver transistors (34) (34) ... However, the latch circuits (32) (32) ... can be omitted when timing control of lighting timing signals and data transfer clocks can be effectively performed. Further, the driver transistors (34) (34) ... may also be omitted when the current capacity of output stages of the AND gates (33) (33) ... is sufficient. In a MOS-type transistor, limitation in current capacity is often significant and generally a bipolar transistor array has been separately prepared especially in case of a C-MOS transistor. However, with a driving current for driving the dots by one driver being no more than 15 mA, P-channel open drain MOS transistors can be employed as the driver transistors (34) (34) ... as shown in the drawing, whereby the driving element (3) can be one-chip monolithized. The sources of the driver transistors (34) (34) ... are commonly connected to an LED lighting power source ($V^+$), and the drain sides are respectively connected to only odd number ones or even number ones of the diodes (20) (20) ... per driving element successively. In other words, if the number of the diodes over the entire length is, e.g., 2592, they are numbered from one end as 1, 2, 3, ..., 2952, to be separated into driving elements directed to odd number ones of 1, 3, 5, 7 ... and driving elements directed to even number ones of 2, 4, 6, 8 ... (refer to FIG. 4). Therefore, the shift registers (31) and (31) are separated into two systems of those storing lighting control data of even number light emitting areas (24) (24) ... and those storing lighting control data of odd number light emitting areas (24) (24) ..., which are connected in series in the respective systems.

Numerals (41), (42) and (42) indicate a toggle-type flip-flop and AND gates forming signal distribution means for distributing serially transferred bit-unit printing data (D) in the shift registers (31) (31) ... of the two systems of odd and even numbers and outputting the same. These are adapted to alternately open and close the AND gates (42) and (42) per one pulse of data transfer clocks ($\phi$) and alternately allow passage of printing data signals, thereby to successively distribute the printing data in the aforementioned two systems. Further, output signals (CL$_1$) and (CL$_2$) of the flip-flop (41) are respectively utilized as clocks for data transferring of the shift registers (31) (31) ... of the respective aforementioned two systems as they are.

Numerals (51) (52) (53) and (54) (54) (54) indicate a trigger circuit (51), an AND gate (52), a counter (53) and set-reset type flip-flops (54), (54) and (54) for producing signals (T$_{70}$), (T$_{80}$) and (T$_{90}$) of the duties of 70%, 80% and 90% of lighting timing based on lighting timing signals (T). Namely, the counter (53) receives the lighting timing signals (T) to count the data transfer clocks ($\phi$), and successively outputs counter outputs when the clock numbers reach those corresponding to 7/10, 8/10 and 9/10 of a lighting timing period (e.g., clock). The flip-flops (54), (54) and (54) receive the rise of the timing signals (T) to be set, and receive outputs (7 clocks, 8 clocks and 9 clocks) of the counter (53) to be reset. Therefore, the outputs are obtained during that period, to become a 70% duty signal (T$_{70}$), an 80% s of these flip-flops (54), (54) and (54) determine substantial lighting times of the diodes (20) (20) ..., and hence they are provided on the substrate (1) in patterns in parallel with the direction of alignment of the LEDs (2) (2) ... , i.e., as the aforementioned duty lines (13a), (13b) and (13c) so that any output line can be selected per element.

These signal distribution means (the flip-flop (41) and the gates (42) and (42)) and intensity control timing means (the trigger circuit (51), the gate (52), the counter (53) and the flip-flops (54), (54) and (54)) are preferably formed by high-speed bipolar transistor logics which are high-speed and excellent in output stability, in the exterior of the substrate (1)..

Figure 6:
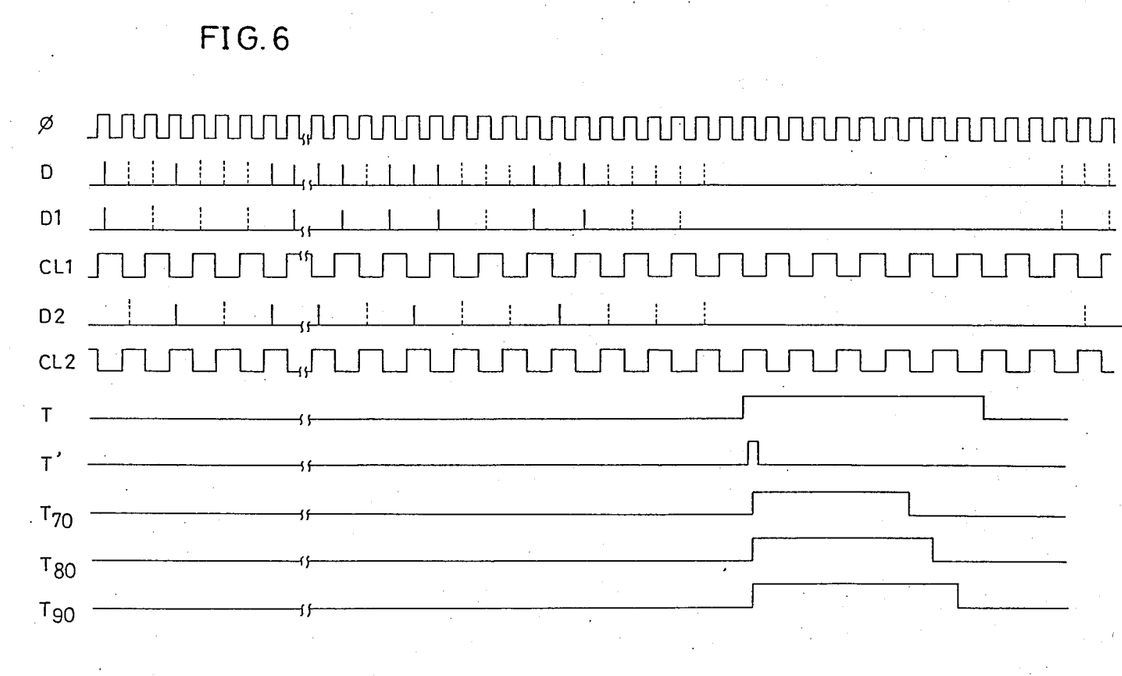
FIG. 6 is a timing chart of FIG. 5.

FIG. 6 is a timing chart of an essential part of FIG. 5. The printing data (D) are transmitted by serial transfer of information H and L on lighting and unlighting of the diodes (20) (20) ... in synchronization with the data transfer clocks ($\phi$) from, e.g., a picture memory, a communication bus or a character code decoder (all not shown). Therefore, the flip-flop (41) forms data transfer clocks (CL$_1$) and (CL$_2$) and the data (D) are guided to the AND gates (42) and (42) thereby to produce uneven number data (D$_1$) and even number data (D$_2$2) synchronized with the same. Thus, the data can be transferred in the same time as required for transferring original series data, and further, the shifting speed in each of the shift registers (31) (31) ... is ½ of the transfer speed of the serial data.

Figure 7:
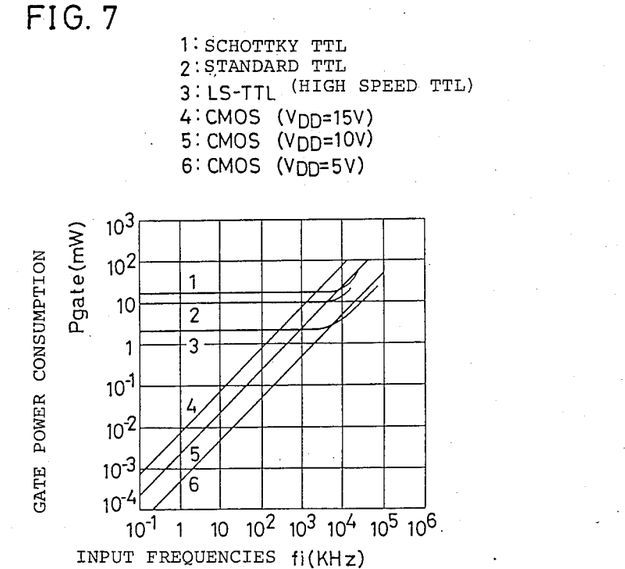
FIG. 7 is a frequency-power consumption characteristic diagram of various types of driving elements.

This is extremely important. FIG. 7 shows a relation between input frequencies and gate power consumption by types of elements, and a low power consumption of a MOS (C-MOS) transistor is obtained when the same is driven at a low voltage, and the response speed is slow at this time. This is because a dynamic power consumption (P) of the C-MOS transistor has the following relation with respect to the input pulse frequency (f), the load capacity (C$_L$) and the power supply voltage (V$_{DD}$):

$P = F \cdot C_L \cdot V_{DD}^2$

It is to be noted that this relation is one with respect to the basic C-MOS unit, and not all of the logics are simultaneously switch-operated when integrated in high density, and a number of gates operate substantially at inner lower clocks and hence the power consumption is less than that in FIG. 7. However, the power consumption can be controlled at a low value slow as the operation speed (data transfer speed) may be, thereby to make effective use of the MOS transistor which is characterized in a low power consumption.

The timing signal (T) for lighting is supplied upon completion of transferring of the printing data (D), and hence the latch circuits (32) (32) ... are latched by an output (T') of the trigger circuit (51) responding to the rise thereof to fetch parallel output data of the shift registers (31) (31) ... and output the same thereby to retain the outputs. Since the AND gates (33) (33) ... perform the high level outputs when the inputting conditions are satisfied, the driver transistors (34) (34) ... are turned on and the diodes (20) (20) ... selectively emit lights. When the same lighting timing signals are supplied in the odd number side and the even number side, the selected ones of the diodes (20) (20) ... are simultaneously lighted without regard to the odd and even numbers. If the lighting timing time has a sufficient margin, the lighting timing can be divided in two for performing time-sharing lighting with the first half in the odd numbers and the latter half in the even numbers. The data of the latch circuits (32) (32) ... are changed only when there are latch signals, and hence data transferring of the next line can be performed during the lighting.

In definite exemplification, in an optical printing head of A4-size resolution of 12 dot/mm and the horizontal scanning dot number of 2592 dots, the data transfer time was about 1.04 msec (2.1 msec in series connection of all of conventional shift registers) with driving at 5 V and a data transfer clock ($\phi$) of 1.25 MHz, and when the lighting current per dot was 10 mA, the power consumption of the optical printing head in lighting of all dots (lighting duty cycle of 0.40) was 5.1 W.

At least one of input signals of the AND gates (33) (33) ... of the driving elements (3) (3) ... is commonly connected per each of the driving elements (3) (3) ... to be terminal-extracted as dimmer lines (35) (35) ... The dimmer lines (35) (35) ... are selectively connected to one of the output lines (T$_{70}$), (T$_{80}$) and (T$_{90}$) of the flip-flops (54), (54) and (54), i.e., the duty lines (13a) (13b) and (13c) by a wire bonding method similarly to other wires.

In assembling of the optical printing head, the LEDs (2) (2) ... and the driving elements (3) (3) ... are placed on and fixed to the substrate (1), and wiring is performed except for the dimmer lines (35) (35) ... The dimmer lines (35) (35) ... are connected by tentative connection with lighting timing signal (T) lines to perform full lighting (either of simultaneous driving and sequential driving will do) thereby to find the average intensity of the light emitting areas (24) (24) . . . For example, when intensity dispersion of a single unit of the LEDs (2) (2) . . . is 8% and output characteristic dispersion of the driving elements (3) (3) . . . is 18%, the values are substantially within ±14% with respect to desired values as a whole. And if the aforementioned average intensity is ±5% desired value, the dimmer lines (35) are connected to the output line ($T_{80}$) (13b) of the 80% duty, and in a similar manner, connected to the output line ($T_{70}$) (13a) of the 70% duty when the same is +5.1 to +14% (brighter by about 10%) and connected to the output line ($T_{90}$) (13c) of the 90% duty when the same is −5.1 to −14% (darker by about 10%) respectively in a selective manner. Thus, the whole intensity dispersion is substantially within ±5%, and hence unevenness in printing density of the LED printer cannot be visually recognized when light emitting peak wavelength of the LEDs (2) (2) . . . is matched with the photosensitive characteristics of the photosensitive member.

Figure 8:
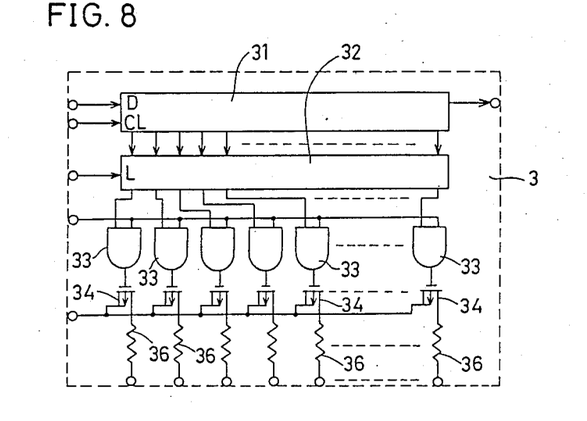
FIGS. 8 and 9 are equivalent circuit diagrams of driving elements according to other embodiments of the present invention.
Figure 9:
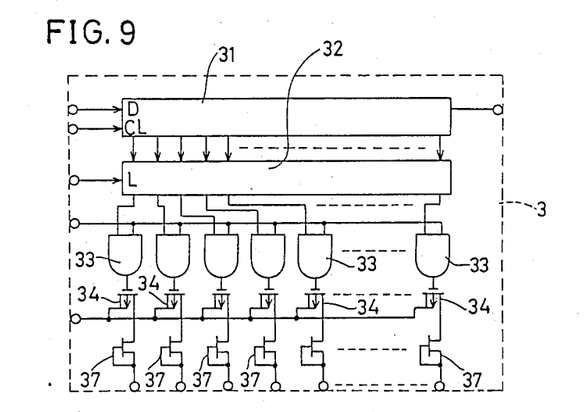

FIGS. 8 and 9 show driving elements (3) which are provided in output stages thereof with means for minimizing intensity dispersion, thereby to prevent characteristic dispersion of diodes (20) (20) . . . of single LEDs (2). In FIG. 8, resistors (36) (36) . . . are connected in series to drains of driver transistors (34) (34) . . . , while constant current elements (37) (37) . . . are connected in a similar manner thereto in FIG. 9. The resistors (36) (36) . . . are formed by structure equal to, e.g., a diffused resistor or a MOS channel transistor, and the intensity can be made uniform as the resistance value is increased. However, if the driving current for the diode (20) is made constant in order to obtain prescribed intensity, the power consumption is more increased in case of a higher resistance value and it is difficult to manufacture one having a high resistance value by application of MOS technique. Thus, the resistance value is preferably 250 to 300 Ω. On the other hand, the constant current elements (37) (37) . . . are formed by self-bias of junction type FET, which FET can be formed by diffusion and evaporation of aluminum electrodes, although the same cannot be manufactured by exactly the same steps as those of MOS circuits of other shift registers etc. Further, when fine adjustment is required in these means, the same may be performed by trimming by etching or by laser light beams in case of the resistors and by supplying connecting lines between gates and drains with resistance components in case of the FET.

Figure 10:
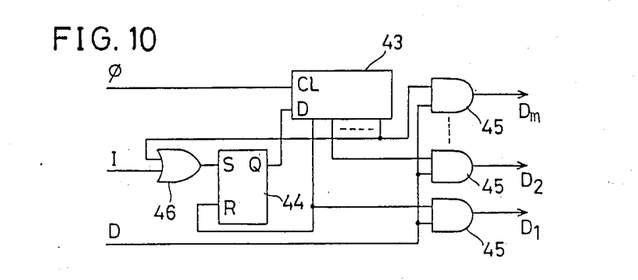
FIG. 10 is a circuit diagram of signal distribution means according to another embodiment of the present invention.

FIG. 10 is a circuit diagram of a signal distribution means in another embodiment of the present invention. Although the light emitting areas (diodes) are separated into an odd number group and an even number group, i.e., into groups $2i-1$ and $2i$ (i indicates a natural number) in the aforementioned embodiment, when the same are separated into m groups so that adjacent light emitting areas (diodes) belong to separate groups, the shifting speed of the data in the respective shift registers can be slowed by the group number m, i.e., to the speed 1/m of the serial data transfer speed. In contrast with this, when the shifting speed of the data in the shift registers may not be slowed so much, the serial data transfer speed can be increased, thereby to cope with a super-high-speed printer. FIG. 10 shows signal distribution means of data (D) when light emitting areas (diodes) are divided into m groups. Employed are m-bit shift registers (43) so that data of the shift registers (43) are produced by a flip-flop (44) which is set at a final bit and reset at the initial bit, thereby to produce 1/m-divided clocks of data transfer clocks ($\phi$). Namely, respective outputs of the shift registers (43) are deviated by one data transfer clock from each other, so that the frequency becomes a pulse train of 1/m of the data transfer clock. By AND of the output of the shift register (43) and the data (D), mi−(m−1), mi−(m−2), . . . , mi (i indicates a natural number) order data are distributed by m AND gates (45) (45) . . . substantially supplying gates for the data. An OR gate (46) is provided for setting the flip-flop (44) by an initial data flag (I) which supplies a first clock timing to be distributed. Although such is not shown, light emitting areas of LEDs must also be divided into m groups so that light emitting areas to be printed with respect to the same belong to groups to be printed, to be coped with m-groups of shift registers which are connected in series per group. Further, if transfer clocks are required for the shift registers, the output signals of the shift register (43) may be utilized.

POSSIBILITY OF INDUSTRIAL UTILIZATION

The optical printing head according to the present invention receives dot information transferred in a high-speed serial manner as inputs, and hence it can be applied to optical printers for printing characters and picture images etc. such as a copying apparatus, a facsimile communication system and a computer terminal. Since data transferring is performed at a low speed in a parallel manner in the head, the present invention is extremely effective in high-speed high-resolution printing. Further, a MOS-type integrated circuit can be utilized by lowering of the transfer speed in the head and the light source is a solid state semiconductor, whereby an extremely quiet optical printing head can be supplied at a low power consumption. Still further, since intensity balance in the light source is adjusted by pairs of driving elements and light emitting diode arrays, the optical printing head can be easily manufactured with printing qualities (printing points and printing density made constant) being extremely excellent. In addition, the dots can be single-arrayed and hence the optical printing head can be easily handled, and further, adjustment with surrounding optical systems (for example, a short-focus lens array and a photosensitive member) whereby the present invention also contributes to simplicity in manufacturing of the optical printer itself and readiness in maintenance thereof.

We claim:

1. An optical printing head for an optical printer comprising:
   (i) a plurality of light emitting diode arrays having a multiplicity of aligned light emitting areas arranged substantially in a line, with one feeding path for each of said light emitting areas being substantially commonly connected, and the other feeding path for said light emitting areas being divided into a plurality of m groups, where m≧2, so that adjacent light emitting areas belong to groups different from each other,
   (ii) means for storing printing data provided for the respective ones of said groups with respect to said other feeding path for light emitting areas of said plurality of light emitting diode arrays, including shift registers for transferring the printing data and driving means for supplying current to said light emitting areas by means of the data from said shift registers, (iii) data distribution means coupled to said shift registers for distributing a series of printing data of one dot line via serial transfer at a predetermined speed in said shift registers for the respective ones of said groups, at a shifting speed of 1/m of said serial transfer speed, and (iv) driving timing means for outputting data simultaneously for the respective ones of said means for storing data from said shift registers to said driving means, and driving said driving means in a static manner for the light emitting areas of one dot line to simultaneously and selectively emit light from said light emitting areas.

2. An optical printing head in accordance with claim 1, wherein group division of said light emitting areas is so performed that they are divided in two, into a group of odd number ones and a group of even numbers of said light emitting areas in order of alignment.

3. An optical printing head in accordance with claim 1, wherein
said means for storing said printing data is formed by a MOS-type integrated circuit.

4. An optical printing head in accordance with claim 1, wherein
said driving means includes a plurality of printing timing means selective in response to light emission intensity.

5. An optical printing head in accordance with claim 3, wherein
said driving means is also formed integrally with said means for storing said printing data and comprises driving power stabilizing means for said light emitting areas.

6. An optical printing head in accordance with claim 4, wherein
said printing timing means include duty lines for transmitting lighting timings different in duty ratio from each other with respect to printing periods.

7. An optical printing head in accordance with claim 6, wherein
said duty lines longitudinally extend substantially in parallel with the extending direction of said light emitting diode arrays.

8. An optical printing head in accordance with claim 1, wherein
said light emitting diode arrays are placed on and fixed to a strip-shaped conductor in a line.

* * * * *